(12) United States Patent
Kinjo et al.

(10) Patent No.: US 11,228,270 B2
(45) Date of Patent: Jan. 18, 2022

(54) DRIVE APPARATUS FOR ROTATING ELECTRIC MACHINE

(71) Applicant: DENSO CORPORATION, Kariya (JP)

(72) Inventors: Hirofumi Kinjo, Nisshin (JP); Yuji Ito, Nisshin (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/985,551

(22) Filed: Aug. 5, 2020

(65) Prior Publication Data
US 2020/0366232 A1 Nov. 19, 2020

Related U.S. Application Data

(63) Continuation of application No. PCT/JP2019/003999, filed on Feb. 5, 2019.

(30) Foreign Application Priority Data

Feb. 6, 2018 (JP) .............................. JP2018-019660

(51) Int. Cl.
H02P 25/18 (2006.01)
H02P 27/06 (2006.01)

(52) U.S. Cl.
CPC ............ *H02P 25/182* (2013.01); *H02P 27/06* (2013.01)

(58) Field of Classification Search
CPC ...... H02P 27/06; H02P 27/2013; H02P 27/01; H02P 1/00; H02P 1/2013; H02P 1/01; H02P 1/04; H02P 1/12; H02P 1/16; H02P 1/163; H02P 1/18; H02P 1/20; H02P 1/24; H02P 1/26; H02P 1/32; H02P 1/42; H02P 1/46; H02P 1/465; H02P 1/54; H02P 3/00; H02P 3/2013; H02P 3/01; H02P 4/00; H02P 4/2013; H02P 4/01; H02P 5/00; H02P 5/2013; H02P 5/01; H02P 6/00;
(Continued)

(56) References Cited

U.S. PATENT DOCUMENTS 8,169,179 B2 * 5/2012 Mohan .................. H02M 5/271
318/800
8,487,568 B2 * 7/2013 Franke .................... B60L 58/33
318/400.3

FOREIGN PATENT DOCUMENTS

EP 3240185 A1 * 11/2017 ................ H02P 6/08
JP 2013-121222 A 6/2013
JP 2013121222 A * 6/2013 .............. H02P 27/06

* cited by examiner

Primary Examiner — Antony M Paul
(74) Attorney, Agent, or Firm — Oliff PLC

(57) ABSTRACT

A drive apparatus is provided for driving a multi-phase rotating electric machine. The rotating electric machine includes a plurality of winding groups for respective phases. The drive apparatus includes a first inverter connected with start terminals of the winding groups of the rotating electric machine, a second inverter connected with intermediate terminals of the winding groups, and an energization controller configured to selectively perform energization of the winding groups by the first inverter and energization of the winding groups by the second inverter. Each of the first and second inverters includes a plurality of switch pairs respectively corresponding to the winding groups and each consisting of an upper-arm switch and a lower-arm switch that are connected in series with each other. Moreover, each of the upper-arm and lower-arm switches of the first inverter is configured to have bidirectionally-conducting and bidirectionally-blocking functions.

6 Claims, 12 Drawing Sheets

(58) Field of Classification Search
CPC .. H02P 6/2013; H02P 6/01; H02P 6/12; H02P 6/14; H02P 6/16; H02P 6/28; H02P 6/32; H02P 9/00; H02P 9/2016; H02P 9/02; H02P 9/007; H02P 9/302; H02P 9/38; H02P 11/00; H02P 21/00; H02P 21/34; H02P 25/062; H02P 27/00; H02P 27/04; H02P 27/08; H02P 2207/05; H02P 2207/076; H02P 2209/01; H02P 2207/055; H02P 25/182; H02M 2007/00; H02M 2005/00; H02M 5/00; H02M 7/00; H02M 7/527; H02M 2001/007; H02M 2001/0077; H02M 7/537; H02M 7/5387

See application file for complete search history.

DRIVE APPARATUS FOR ROTATING ELECTRIC MACHINE

CROSS-REFERENCE TO RELATED APPLICATIONS

The present application is a continuation application of International Application No. PCT/JP2019/003999 filed on Feb. 5, 2019, which is based on and claims priority from Japanese Patent Application No. 2018-019660 filed on Feb. 6, 2018. The contents of these applications are hereby incorporated by reference in their entirety into the present application.

BACKGROUND

1 Technical Field

The present disclosure relates to drive apparatuses for rotating electric machines.

2 Description of Related Art

There is known a motor drive apparatus configured to enable extension of the rotational speed range of an electric motor. Specifically, the electric motor has three phase windings Y-connected to define a neutral point therebetween. Each of the phase windings is formed of a winding group consisting of a plurality of winding units that are connected in series with each other. Moreover, each of the phase windings has a start terminal (or contact) formed at an end of the phase winding on the opposite side to the neutral point and an intermediate terminal (or contact) formed between two of the winding units of the winding group forming the phase winding. The motor drive apparatus has a first inverter connected with the start terminals of the phase windings and a second inverter connected with the intermediate terminals of the phase windings. The motor drive apparatus drives the electric motor with either of the first and second inverters according to the operating state of the electric motor. More specifically, the motor drive apparatus drives the electric motor with the first inverter during low-speed rotation of the electric motor and with the second inverter during high-speed rotation of the electric motor.

Moreover, when the motor drive apparatus drives the electric motor with the second inverter during high-speed rotation of the electric motor, an induced voltage may be applied to the start terminals of the phase windings which are connected with the first inverter that is in a non-operating state. Further, upon the induced voltage exceeding a given voltage, regenerative current may flow through flyback diodes (or freewheeling diodes) provided in the first inverter, causing the operation of the electric motor to become unstable. To solve this problem, the motor drive apparatus is configured to open a disconnect switch that is provided in an energization path of the first inverter, thereby cutting off the energization path before generation of regenerative current. More specifically, the motor drive apparatus is configured to have at least one switch circuit provided in a high-potential-side path, a low-potential-side path or winding connection paths of the first inverter.

SUMMARY

According to the present disclosure, there is provided a first drive apparatus for driving a multi-phase rotating electric machine. The rotating electric machine includes a plurality of winding groups for respective phases. Each of the winding groups consists of a plurality of winding units that are connected in series with each other. Each of the winding groups has a first end and a second end. All of the first ends of the winding groups are connected together to define a neutral point therebetween. Each of the winding groups also has a start terminal formed at the second end thereof and an intermediate terminal formed between two of the winding units thereof. The first drive apparatus includes a first inverter, a second inverter and an energization controller. The first inverter is connected with the start terminals of the winding groups of the rotating electric machine. The first inverter includes a plurality of switch pairs respectively corresponding to the winding groups of the rotating electric machine and each consisting of an upper-arm switch and a lower-arm switch that are connected in series with each other. The second inverter is connected with the intermediate terminals of the winding groups of the rotating electric machine. The second inverter includes a plurality of switch pairs respectively corresponding to the winding groups of the rotating electric machine and each consisting of an upper-arm switch and a lower-arm switch that are connected in series with each other. The energization controller is configured to selectively perform energization of the winding groups of the rotating electric machine by the first inverter and energization of the winding groups by the second inverter. Moreover, each of the upper-arm and lower-arm switches of the first inverter is configured to have bidirectionally-conducting and bidirectionally-blocking functions.

According to the present disclosure, there is also provided a second drive apparatus for driving a rotating electric machine. The rotating electric machine includes a first multi-phase coil and a second multi-phase coil. Each of the first and second multi-phase coils is composed of a plurality of winding units for respective phases. Each of the winding units has a first end and a second end. All of the first ends of the winding units are connected together to define a neutral point therebetween. The second drive apparatus includes a first inverter, a second inverter and an energization controller. The first inverter is connected with the second ends of the winding units of the first multi-phase coil. The first inverter includes a plurality of switch pairs respectively corresponding to the winding units of the first multi-phase coil and each consisting of an upper-arm switch and a lower-arm switch that are connected in series with each other. The second inverter is connected with the second ends of the winding units of the second multi-phase coil. The second inverter includes a plurality of switch pairs respectively corresponding to the winding units of the second multi-phase coil and each consisting of an upper-arm switch and a lower-arm switch that are connected in series with each other. The energization controller is configured to selectively perform energization of the first multi-phase coil by the first inverter and energization of the second multi-phase coil by the second inverter. Moreover, the number of turns of the first multi-phase coil is larger than the number of turns of the second multi-phase coil. In the first inverter, either or both of the upper-arm switches and the lower-arm switches are configured to each have bidirectionally-conducting and bidirectionally-blocking functions.

DESCRIPTION OF EMBODIMENTS

Figure 1:
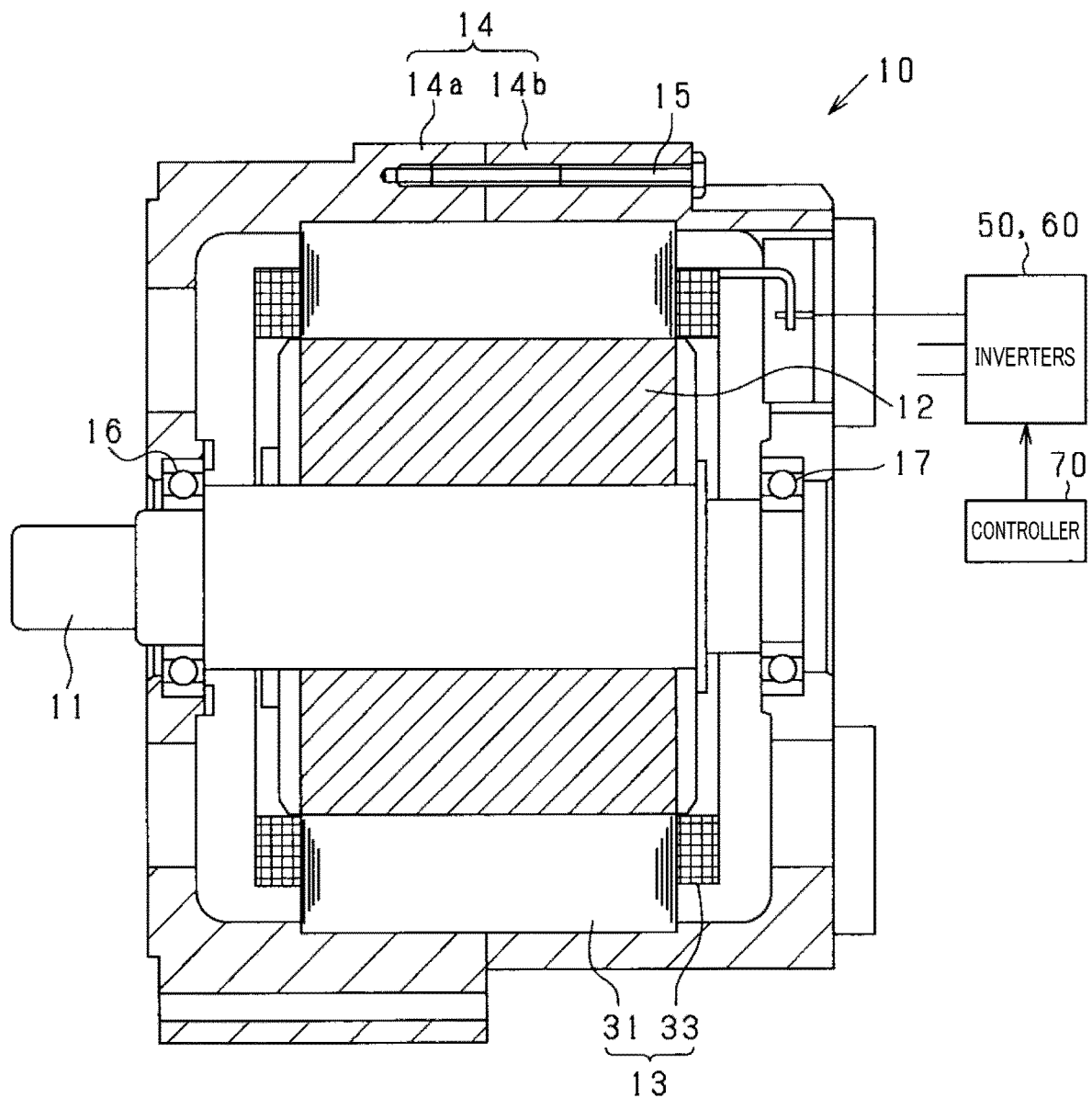
FIG. 1 is a longitudinal cross-sectional view of a rotating electric machine according to a first embodiment.

In the above-described motor drive apparatus known in the art (see, for example, Japanese Patent Application Publication No. JP2013121222A), it is necessary to keep the disconnect switch in an ON state when the electric motor is driven by the first inverter to rotate at low speed. Consequently, the number of serially-connected elements in a current conduction path of the electric motor is increased, thereby increasing the electrical resistance and thus the conduction loss along the current conduction path. For example, in the case of the electric motor and the motor drive apparatus being used in an electrically-driven vehicle, they may be placed in a thermally severe condition during low-speed uphill traveling of the vehicle (i.e., during low-speed rotation of the electric motor). In this case, with increase in the conduction loss (or the amount of heat generated) during low-speed rotation of the electric motor due to the employment of the additional disconnect switch, it may become necessary to review the cooling performance of the electric motor and the motor drive apparatus.

In addition, the above problem may occur also in cases where: a rotating electric machine includes a first multi-phase coil having a larger number of turns and a second multi-phase coil having a smaller number of turns; a drive apparatus has a first inverter connected with the first multi-phase coil and a second inverter connected with the second multi-phase coil; and the drive apparatus drives the rotating electric machine with either of the first and second inverters according to the operating state of the rotating electric machine.

In contrast, in the above-described first drive apparatus according to the present disclosure, during the energization of the winding groups by the second inverter, i.e., when only part of each of the winding groups is energized, regenerative current may flow through the first inverter, which is in a non-operating state (or stopped state), upon application of an induced voltage to the start terminals of the winding groups. However, according to the present disclosure, each of the upper-arm and lower-arm switches of the first inverter is configured to have the bidirectionally-conducting and bidirectionally-blocking functions. Consequently, it becomes possible to prevent generation of regenerative current flowing through the first inverter, without employing any regenerative current prevention switch in addition to the upper-arm and lower-arm switches of the first inverter. Hence, it becomes possible to perform suitable energization control while preventing, during the energization of the winding groups by the first inverter, the conduction loss along each of the current conduction paths of the winding groups from increasing due to an increase in the electrical resistance along each of the current conduction paths.

In a further implementation, in the first drive apparatus according to the present disclosure, each of the upper-arm and lower-arm switches of the first inverter may be configured as a bidirectional switch which has a pair of IGBTs (Insulated Gate Bipolar Transistors) connected in antiparallel to each other. In this case, during the energization of the winding groups by the first inverter, the number of serially-connected elements in a conducting state in each of the current conduction paths of the winding groups will become equal to 2. Hence, it will become possible to perform suitable energization control while preventing the conduction loss along each of the current conduction paths of the winding groups from increasing due to an increase in the number of serially-connected elements in each of the current conduction paths. Moreover, it will also become possible to impart the function of a flyback diode to each of the upper-arm and lower-arm switches of the first inverter.

In the first drive apparatus according to the present disclosure, during the energization of the winding groups of the rotating electric machine by the first inverter, for each of the upper-arm and lower-arm switches of the first inverter, the energization controller may turn on and off one of the pair of IGBTs of the switch while keeping the other of the pair of IGBTs of the switch in an ON state. In this case, those IGBTs of the upper-arm and lower-arm switches of the first inverter which are kept in the ON state can function as flyback diodes. Moreover, it will become possible to minimize the number of times of each of the upper-arm and lower-arm switches of the first inverter being switched (or turned on and off), thereby minimizing the switching loss.

In the first drive apparatus according to the present disclosure, each of the upper-arm and lower-arm switches of the first inverter may be configured with a pair of reverse-blocking IGBTs connected in antiparallel to each other. Each of the upper-arm and lower-arm switches of the second inverter may be configured with a semiconductor switching element having a flyback diode connected in antiparallel thereto. In this case, it will become possible to employ the reverse-blocking IGBTs only for the switches of the first inverter while utilizing an existing inverter configuration where each of the upper-arm and lower-arm switches is configured with a semiconductor switching element having a flyback diode connected in antiparallel thereto.

In the first drive apparatus according to the present disclosure, each of the winding groups of the rotating electric machine may consist of three or more winding units that are connected in series with each other. Each of the winding groups may have two or more intermediate terminals each of which is formed between one adjacent pair of the winding units of the winding group. The drive apparatus may include two or more second inverters that are connected respectively with the two or more intermediate terminals in each of the winding groups. Each of the two or more second inverters may include a plurality of switch pairs respectively corresponding to the winding groups and each consisting of an upper-arm switch and a lower-arm switch that are connected in series with each other. Moreover, of the two or more second inverters, at least the second inverter that is connected with the intermediate terminal located closest to the start terminal in each of the winding groups may have the upper-arm and lower-arm switches thereof configured to each have bidirectionally-conducting and bidirectionally-blocking functions. In this case, it will become possible to suitably switch the drive mode of the rotating electric machine between three or more drive modes while preventing the conduction loss along each of the current conduction paths of the winding groups from increasing due to an increase in the electrical resistance along each of the current conduction paths (or an increase in the number of serially-connected elements in each of the current conduction paths).

On the other hand, in the above-described second drive apparatus according to the present disclosure, the drive mode of the rotating electric machine may be switched by the energization controller between a first drive mode in which the first multi-phase coil having the larger number of turns is energized by the first inverter and a second drive mode in which the second multi-phase coil having the smaller number of turns is energized by the second inverter. In the second drive mode of the rotating electric machine (i.e., when the second multi-phase coil having the smaller number of turns is energized by the second inverter), regenerative current may flow through the first inverter that is in a non-operating state (or stopped state), upon application of an induced voltage, which is induced in the first multi-phase coil having the larger number of turns, to the first inverter. However, according to the present disclosure, in the first inverter, either or both of the upper-arm switches and the lower-arm switches are configured to each have bidirectionally-conducting and bidirectionally-blocking functions. Consequently, it becomes possible to prevent generation of regenerative current flowing through the first inverter, without employing any regenerative current prevention switch in addition to the upper-arm and lower-arm switches of the first inverter. Hence, it becomes possible to perform suitable energization control while preventing, in the first drive mode of the rotating electric machine, the conduction loss along each of the current conduction paths of the winding units of the first multi-phase coil from increasing due to an increase in the number of serially-connected elements in each of the current conduction paths.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

First Embodiment

Figure 2:
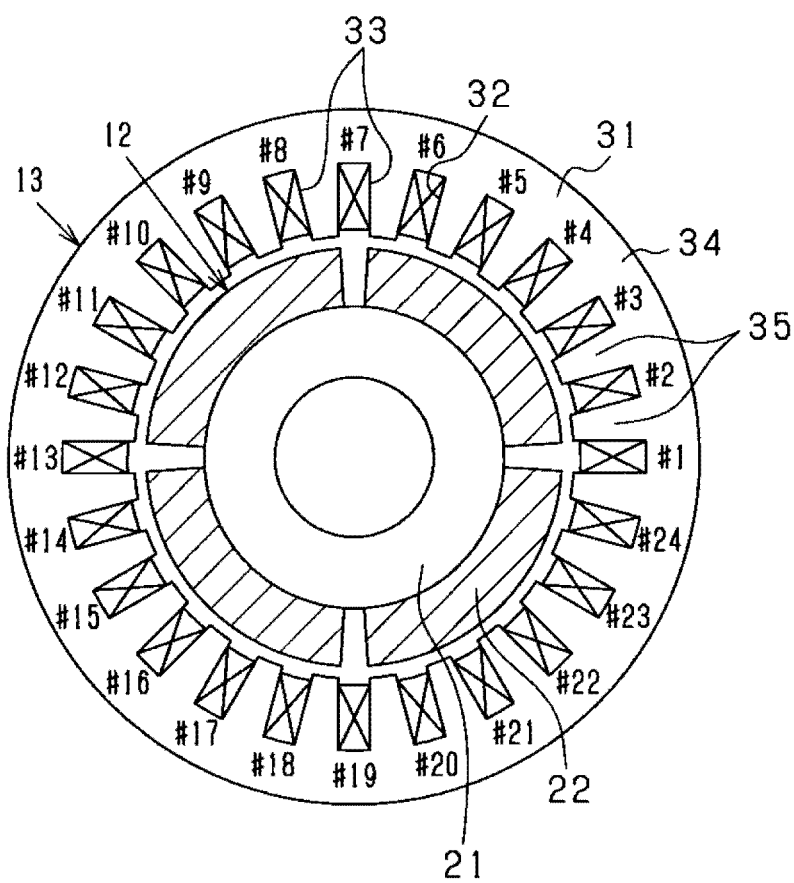
FIG. 2 is a transverse cross-sectional view of both a rotor and a stator of the rotating electric machine according to the first embodiment.

FIGS. 1 and 2 together show the configuration of a rotating electric machine 10 according to the first embodiment.

In the present embodiment, the rotating electric machine 10 is designed to be used as a mechanical power source in, for example, an electrically-driven vehicle. It should be noted that the rotating electric machine 10 may alternatively be used for other applications, such as industrial, marine, aviation, household, office automation and amusement applications.

More particularly, in the present embodiment, the rotating electric machine 10 is configured as an inner rotor type (i.e., inner rotating type) multi-phase AC motor.

FIG. 1 is a longitudinal cross-sectional view of the rotating electric machine 10 along a central axis of a rotating shaft 11 of the rotating electric machine 10. FIG. 2 is a transverse cross-sectional view of both a rotor 12 and a stator 13 of the rotating electric machine 10 along a plane perpendicular to the central axis of the rotating shaft 11.

Hereinafter, the direction in which the central axis of the rotating shaft 11 extends will be referred to as axial direction; the directions of extending radially from the central axis of the rotating shaft 11 will be referred to as radial directions; and the direction of extending along a circle whose center is on the central axis of the rotating shaft 11 will be referred to as circumferential direction.

The rotating electric machine 10 includes the rotating shaft 11, the rotor 12 fixed on the rotating shaft 11, the stator 13 provided at such a position as to surround the rotor 12, and a housing 14 that receives both the rotor 12 and the stator 13 therein. In addition, the rotor 12 and the stator 13 are arranged coaxially with each other.

The housing 14 has a substantially hollow cylindrical shape with both axial ends thereof closed. The housing 14 is composed of a pair of cup-shaped housing pieces 14*a* and 14*b*. The housing pieces 14*a* and 14*b* are fastened, for example by bolts 15, into one piece with open ends thereof opposed to each other. The housing 14 has a pair of bearings 16 and 17 provided respectively in opposite axial end walls thereof.

The rotating shaft 11 is rotatably supported by the housing 14 via the pair of bearings 16 and 17.

The rotor 12 is fixedly fitted on the rotating shaft 11 so as to rotate together with the rotating shaft 11. The rotor 12 includes a hollow cylindrical rotor core 21 and a plurality of permanent magnets 22 arranged on a radially outer periphery of the rotor core 21 (i.e., outer periphery of the rotor core 21 radially facing a radially inner periphery of the stator 13) in alignment with each other in the circumferential direction.

In the present embodiment, the rotor core 21 is formed by laminating a plurality of annular magnetic steel sheets in the axial direction and fixing them together by, for example, staking.

Moreover, in the present embodiment, the rotor 12 is configured as a four-pole SPM (Surface Permanent Magnet) rotor. That is, the permanent magnets 22 are arranged on the radially outer surface of the rotor core 21 to form a plurality (e.g., four in the present embodiment) of magnetic poles the polarities of which alternate between north and south in the circumferential direction. It should be noted that the rotor 12 may alternatively be configured as an IPM (Interior Permanent Magnet) rotor. In addition, the permanent magnets 22 may be implemented by rare-earth magnets or ferrite magnets.

The stator 13 includes an annular (or hollow cylindrical) stator core 31 having a plurality of slots 32 formed therein and a three-phase stator coil 33 mounted on the stator core 31 so as to be received in the slots 32 of the stator core 31.

In the present embodiment, the stator core 31 is formed by laminating a plurality of annular magnetic steel sheets in the axial direction and fixing them together by, for example, staking. The stator core 31 includes an annular core 34 and a plurality of teeth 35 that each extend radially inward from the yoke 34 and are arranged at equal intervals in the circumferential direction. Each of the slots 32 is formed between one circumferentially-adjacent pair of the teeth 35.

Figure 3:
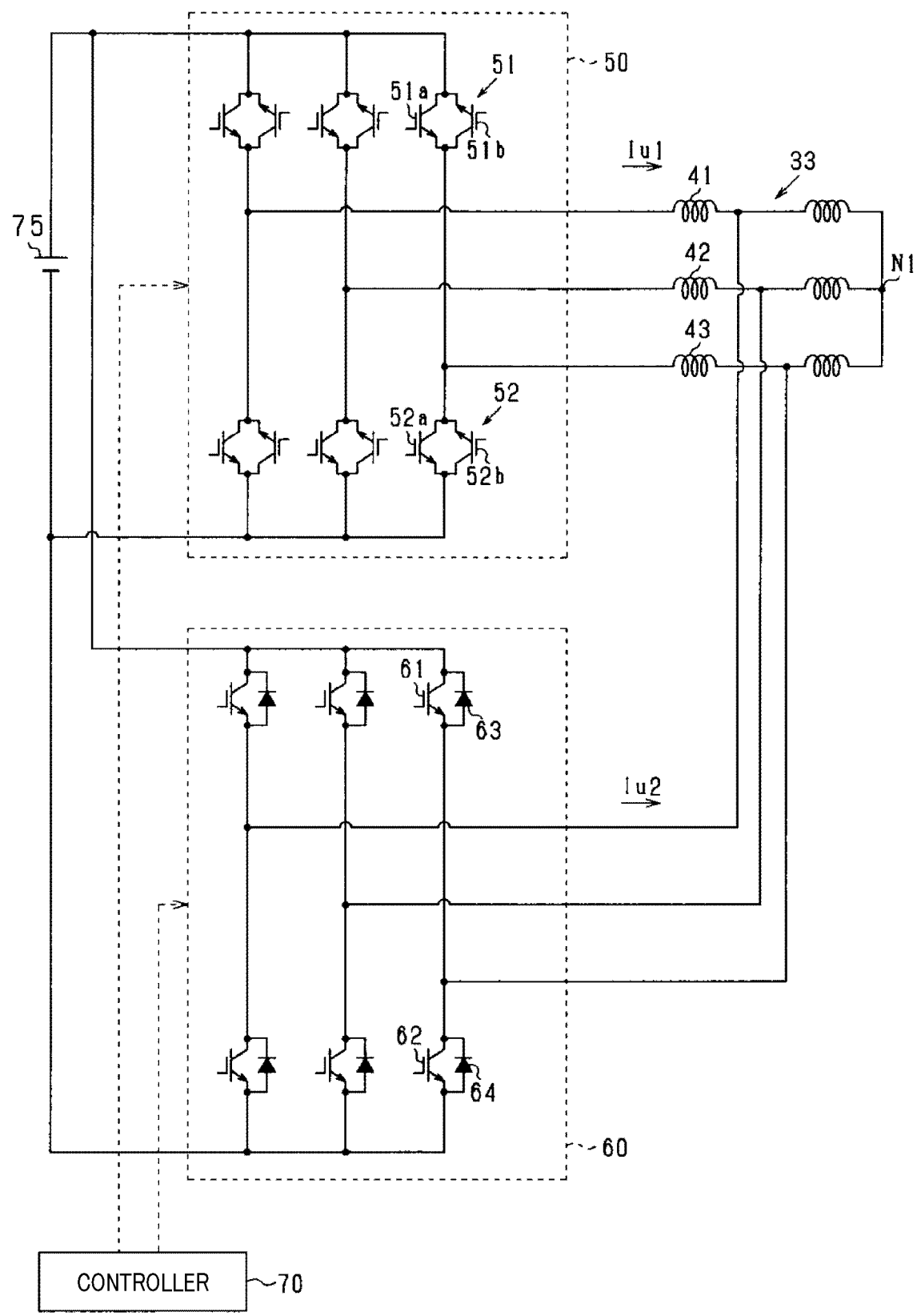
FIG. 3 is a schematic circuit diagram illustrating the configuration of a control system for controlling the rotating electric machine according to the first embodiment.

The stator coil 33 is composed of a U-phase winding, a V-phase winding and a W-phase windings that are Y-connected (i.e., star-connected) to define a neutral point N1 therebetween. As shown in FIG. 3, the U-phase, V-phase and W-phase windings are respectively formed of winding groups 41, 42 and 43; each of the winding groups 41-43 consists of a plurality of winding units that are connected in series with each other.

More specifically, in the present embodiment, the stator coil 33 is composed of the U-phase winding group 41 (i.e., the U-phase winding), the V-phase winding group 42 (i.e., the V-phase winding) and the W-phase winding group 43 (i.e., the W-phase winding). Each of the winding groups 41-43 consists of two winding units that are connected in series with each other. Moreover, in each of the winding groups 41-43, the numbers of turns of the two winding units are set to be equal to each other. In addition, the stator coil 33 is mounted on the stator core 31 so that in each of the slots 32, there are received only the winding units of a same one of the winding groups 41-43.

It should be noted that the number of poles of the rotor 12, the number of phases of the stator coil 33, the number of the slots 32 and the number of the serially-connected winding units in each of the winding groups 41-43 may be arbitrarily set. In addition, in the example shown in FIG. 2, in the stator core 31, there are formed twenty-four slots 32 which are sequentially numbered as #1, #2, . . . , and #24 in the counterclockwise direction.

Next, the configuration of a control system for controlling (or drive apparatus for driving) the rotating electric machine 10 according to the present embodiment will be described with reference to FIG. 3.

In the present embodiment, the control system includes a first inverter 50, a second inverter 60 and a controller 70.

The first inverter 50 is connected with start terminals of the winding groups 41-43 forming the stator coil 33. The start terminals of the winding groups 41-43 are formed respectively at ends of the winding groups 41-43 on the opposite side to the neutral point N1. More specifically, each of the winding groups 41-43 has first and second ends opposite to each other. All of the first ends of the winding groups 41-43 are connected together to define the neutral point N1 therebetween. Moreover, each of the winding groups 41-43 has the start terminal formed at the second end thereof.

The second inverter 60 is connected with intermediate terminals of the winding groups 41-43 forming the stator coil 33. In each of the winding groups 41-43, the intermediate terminal is formed between the two winding units of the winding group.

As described above, in the present embodiment, the numbers of turns of the two winding units in each of the winding groups 41-43 are set to be equal to each other. Therefore, the ratio between the number of turns energized by the first inverter 50 and the number of turns energized by the second inverter 60 in each of the winding groups 41-43 is equal to (2:1).

Each of the first and second inverters 50 and 60 is configured with a full bridge circuit having a plurality of pairs of upper and lower arms. The number of pairs of the upper and lower arms is equal to the number of phases of the stator coil 33. Each of the upper and lower arms has a switch (or semiconductor switching element) provided therein. In operation, electric current supplied to each of the winding groups 41-43 is controlled by turning on/off the switches of the upper and lower arms.

Specifically, the first inverter 50 includes three switch pairs respectively corresponding to the three phases (i.e., U, V, and W phases) of the stator coil 33 and each consisting of an upper-arm switch 51 and a lower-arm switch 52 that are connected in series with each other. Moreover, for each of the three phases, a high-potential-side terminal of the upper-arm switch 51 corresponding to the phase is connected to a positive terminal of a DC power supply 75; and a low-potential-side terminal of the lower-arm switch 52 corresponding to the phase is connected to a negative terminal of the DC power supply 75 (or grounded).

In the present embodiment, each of the upper-arm switches 51 of the first inverter 50 is configured with a pair of IGBTs (Insulated Gate Bipolar Transistors) 51a and 51b that are connected in opposite directions and parallel to each other. The pair of IGBTs 51a and 51b is implemented by a pair of reverse-blocking IGBTs connected in antiparallel to each other. Consequently, each of the upper-arm switches 51 of the first inverter 50 can function as a bidirectional switch to bidirectionally conduct and bidirectionally block electric current. More specifically, for each of the upper-arm switches 51, the IGBTs 51a and 51b forming the upper-arm switch 51 are connected in antiparallel to each other such that the IGBT 51a has its collector connected to the higher potential side and its emitter connected to the lower potential side, whereas the IGBT 51b has its emitter connected to the higher potential side and its collector connected to the lower potential side.

Similarly, each of the lower-arm switches 52 of the first inverter 50 is configured with a pair of IGBTs 52a and 52b that are connected in opposite directions and parallel to each other. The pair of IGBTs 52a and 52b is implemented by a pair of reverse-blocking IGBTs connected in antiparallel to each other. Consequently, each of the lower-arm switches 52 of the first inverter 50 can function as a bidirectional switch to bidirectionally conduct and bidirectionally block electric current. More specifically, for each of the lower-arm switches 52, the IGBTs 52a and 52b forming the lower-arm switch 52 are connected in antiparallel to each other such that the IGBT 52a has its collector connected to the higher potential side and its emitter connected to the lower potential side, whereas the IGBT 52b has its emitter connected to the higher potential side and its collector connected to the lower potential side.

On the other hand, the second inverter 60 includes three switch pairs respectively corresponding to the three phases (i.e., U, V, and W phases) of the stator coil 33 and each consisting of an upper-arm switch 61 and a lower-arm switch 62 that are connected in series with each other. Moreover, for each of the three phases, a high-potential-side terminal of the upper-arm switch 61 corresponding to the phase is connected to the positive terminal of the DC power supply 75; and the low-potential-side terminal of the lower-arm switch 62 corresponding to the phase is connected to the negative terminal of the DC power supply 75 (or grounded).

In the present embodiment, each of the upper-arm switches 61 of the second inverter 60 is configured with a semiconductor switching element (e.g., an IGBT) having a flyback diode (or freewheeling diode) 63 connected in antiparallel thereto; the flyback diode 63 has its cathode connected to the higher potential side and its anode connected to the lower potential side.

Similarly, each of the lower-arm switches 62 of the second inverter 60 is configured with a semiconductor switching element (e.g., an IGBT) having a flyback diode 64 connected in antiparallel thereto; the flyback diode 64 has its cathode connected to the higher potential side and its anode connected to the lower potential side.

The controller 70 is configured with a microcomputer which includes a CPU (Central Processing Unit) and various memories. The controller 70 controls, based on various types of information detected in the rotating electric machine 10 and a power running drive request (or torque generation request) or an electric power generation request, the open/closed states (or ON/OFF states) of the switches 51-52 and 61-62 of the first and second inverters 50 and 60, thereby controlling energization of the winding groups 41-43 forming the stator coil 33. The various types of information detected in the rotating electric machine 10 include, for example, the rotation angle (or electrical angle information) of the rotor 12 detected by a rotation angle sensor such as a resolver, the output voltage of the DC power supply 75 (or the input voltage of the first and second inverters 50 and 60) detected by a voltage sensor, and the electric currents supplied to the winding groups 41-43 detected by at least one current sensor. In addition, the at least one current sensor may be provided for each of the first and second inverters 50 and 60 or shared by the first and second inverters 50 and 60. The controller 70 generates operation signals for operating the switches 51-52 and 61-62 of the first and second inverters 50 and 60 and outputs the generated operation signals to the first and second inverters 50 and 60.

In the present embodiment, energization of the stator coil 33 of the rotating electric machine 10 is controlled with the first and second inverters 50 and 60. Moreover, the drive mode of the rotating electric machine 10 is switched between a first drive mode in which the rotating electric machine 10 is driven by the first inverter 50 (i.e., energization is performed for the whole of each of the winding groups 41-43) and a second drive mode in which the rotating electric machine 10 is driven by the second inverter 60 (i.e., energization is performed for only part of each of the winding groups 41-43). By this switching, the number of energized turns in each of the winding groups 41-43 becomes variable.

Figure 4:
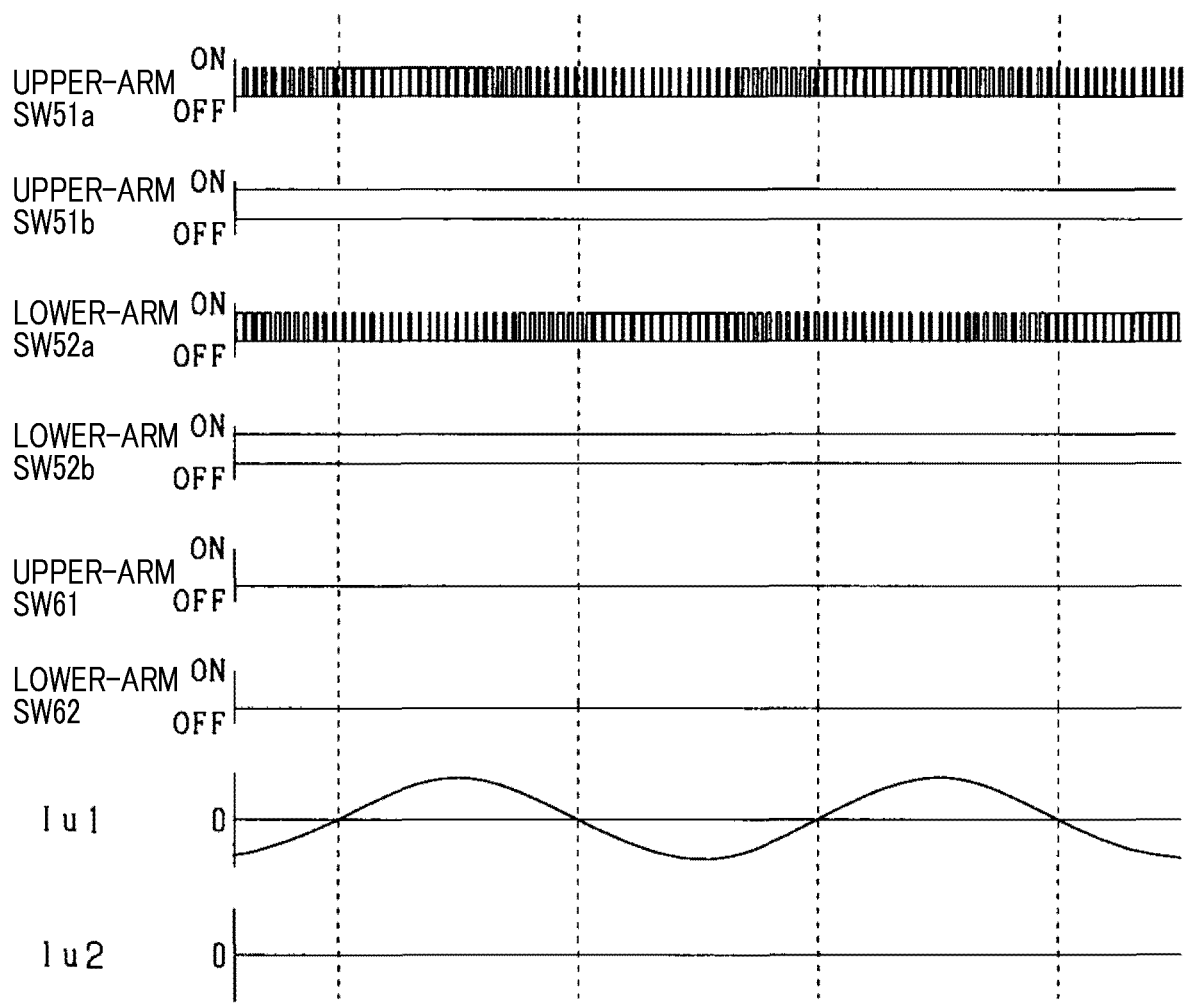
FIG. 4 is a time chart illustrating operation of the control system when the rotating electric machine according to the first embodiment is driven by a first inverter of the control system.

FIG. 4 illustrates the ON/OFF states of the switches 51-52 and 61-62 of the first and second inverters 50 and 60 when the rotating electric machine 10 is driven by the first inverter 50. On the other hand, FIG. 5 illustrates the ON/OFF states of the switches 51-52 and 61-62 of the first and second inverters 50 and 60 when the rotating electric machine 10 is driven by the second inverter 60.

Figure 5:
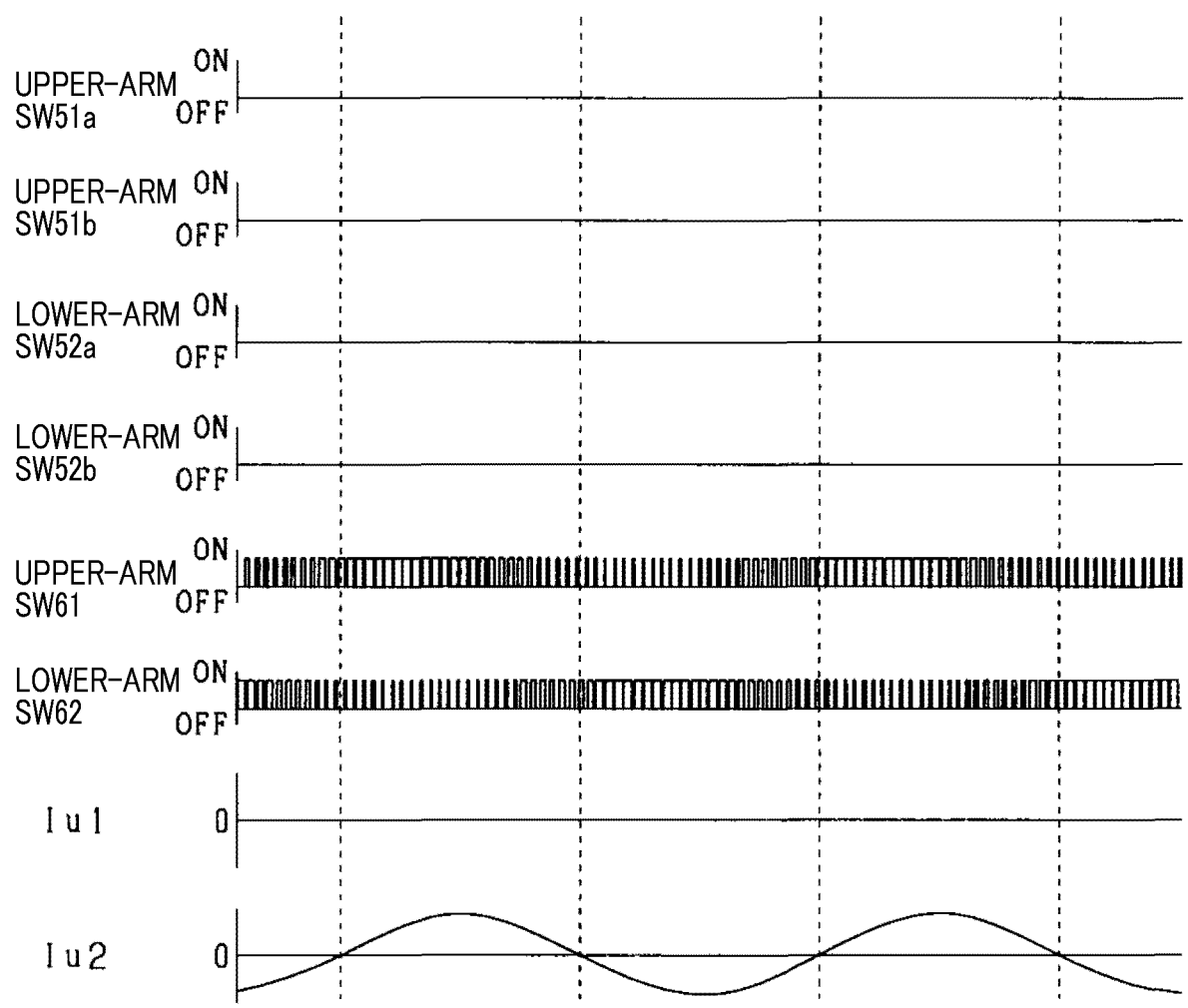
FIG. 5 is a time chart illustrating operation of the control system when the rotating electric machine according to the first embodiment is driven by a second inverter of the control system.

In addition, in FIGS. 4 and 5, there is shown only change in the U-phase current supplied to the U-phase winding group 41 of the three-phase stator coil 33. However, it should be noted that the V-phase and W-phase currents supplied respectively to the V-phase and W-phase winding groups 42 and 43 of the stator coil 33 change in the same manner as the U-phase current except that the phases of the U-phase, V-phase and W-phase currents are offset from each other by 120° in electrical angle.

As shown in FIG. 4, when the rotating electric machine 10 is driven by the first inverter 5, for each of the U-phase, V-phase and W-phase winding groups 41-43, the upper-arm and lower-arm switches 51 and 52 of the first inverter 50 corresponding to (i.e., connected with) the winding group are turned on and off in a complementary manner, thereby energizing the winding group. More specifically, the IGBT 51a of the upper-arm switch 51 (i.e., that one of the pair of IGBTs forming the upper-arm switch 51 which has its collector connected to the higher potential side) and the IGBT 52a of the lower-arm switch 52 (i.e., that one of the pair of IGBTs forming the lower-arm switch 52 which has its collector connected to the higher potential side) are turned on and off in a complementary manner, while both the IGBT 51b of the upper-arm switch 51 and the IGBT 52b of the lower-arm switch 52 are kept in an ON state (or closed state). That is, each of the IGBTs 51b and 52b, which are kept in the ON state, performs the same function as a flyback diode. At the same time, all of the upper-arm and lower-arm switches 61 and 62 of the second inverter 60 are kept in an OFF state (or open state). Consequently, both the serially-connected winding units of each of the winding groups 41-43 are energized (or supplied with electric current) by the first inverter 50.

In contrast, as shown in FIG. 5, when the rotating electric machine 10 is driven by the second inverter 60, for each of the U-phase, V-phase and W-phase winding groups 41-43, the upper-arm and lower-arm switches 61 and 62 of the second inverter 60 corresponding to the winding group are turned on and off in a complementary manner, thereby energizing the winding group. At the same time, all of the upper-arm and lower-arm switches 51 and 52 (i.e., all of the IGBTs 51a-51b and 52a-52b) of the first inverter 50 are kept in an OFF state. Consequently, in each of the winding groups 41-43, only that one of the two serially-connected winding units which is on the neutral point N1 side is energized by the second inverter 60.

Moreover, when the rotating electric machine 10 is driven by the second inverter 60, i.e., when only the neutral point N1-side winding unit of each of the winding groups 41-43 is energized, an induced voltage may be applied to the start terminals of the winding groups 41-43 which are connected with the first inverter 50 that is in a non-operating state (or stopped state). Upon application of the induced voltage, regenerative current may flow through the switches 51 and 52 of the first inverter 50, causing operation of the rotating electric machine 10 to become unstable. To solve this problem, according to the prior art, a disconnect switch may be provided in an energization path of the first inverter 50 to cut off the energization path before generation of regenerative current. However, in this case, it would be necessary to keep the disconnect switch in an ON state when the rotating electric machine 10 is driven by the first inverter 50. Consequently, the number of serially-connected elements in a current conduction path of the rotating electric machine 10 would be increased, thereby increasing the electrical resistance and thus the conduction loss along the current conduction path.

In view of the above, in the present embodiment, each of the upper-arm and lower-arm switches 51 and 52 of the first inverter 50 is configured to have bidirectionally-conducting and bidirectionally-blocking functions (in other words, configured to be capable of bidirectionally conducting and bidirectionally blocking electric current). Consequently, it becomes possible to prevent generation of regenerative current flowing through the first inverter 50, without employing any regenerative current prevention switch in addition to the upper-arm and lower-arm switches 51 and 52 of the first inverter 50. Moreover, the number of serially-connected elements in each of the current conduction paths of the winding groups 41-43 during the drive of the rotating electric machine 10 by the first inverter 50 is equal to 2, i.e., equal to the number of serially-connected elements in each of the current conduction paths of the winding groups 41-43 during the drive of the rotating electric machine 10 by the second inverter 60. Hence, it becomes possible to prevent, during the drive of the rotating electric machine 10 by the first inverter 50, the conduction loss along each of the current conduction paths of the winding groups 41-43 from increasing due to an increase in the number of serially-connected elements in each of the current conduction paths.

In the present embodiment, the controller 70 switches, based on the rotational speed and torque of the rotating electric machine 10, the drive mode of the rotating electric machine 10 between the first drive mode in which the rotating electric machine 10 is driven by the first inverter 50 and the second drive mode in which the rotating electric machine 10 is driven by the second inverter 60. More specifically, the controller 70 performs: energization of the winding groups 41-43 by the first inverter 50 when the rotating electric machine 10 operates in a first operation region on the lower rotational speed side; and energization of the winding groups 41-43 by the second inverter 60 when the rotating electric machine 10 operates in a second operation region on the higher rotational speed side.

Figure 6:
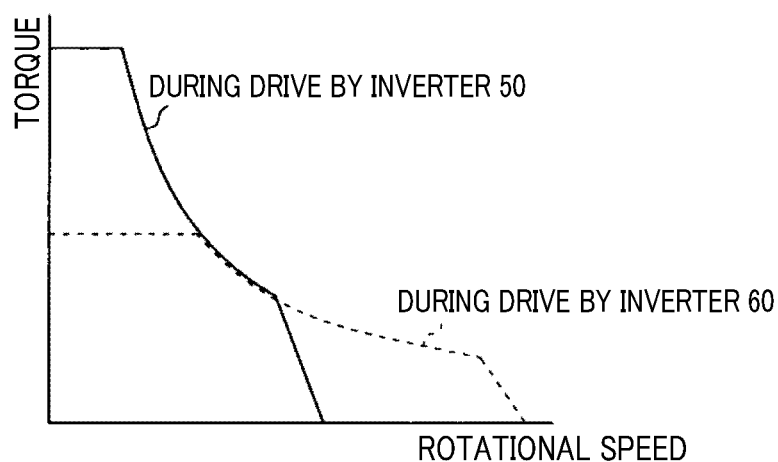
FIG. 6 is a graphical representation illustrating the output characteristics of the rotating electric machine according to the first embodiment both when the machine is driven by the first inverter and when the machine is driven by the second inverter.

In FIG. 6, the output characteristics of the rotating electric machine 10 in the first drive mode (i.e., when the machine 10 is driven by the first inverter 50) are shown with a solid line; and the output characteristics of the rotating electric machine 10 in the second drive mode (i.e., when the machine 10 is driven by the second inverter 60) are shown with a dashed line. As seen from FIG. 6, the output characteristics of the rotating electric machine 10 in the first drive mode and the output characteristics of the rotating electric machine 10 in the second drive mode partially overlap each other.

Figure 7:
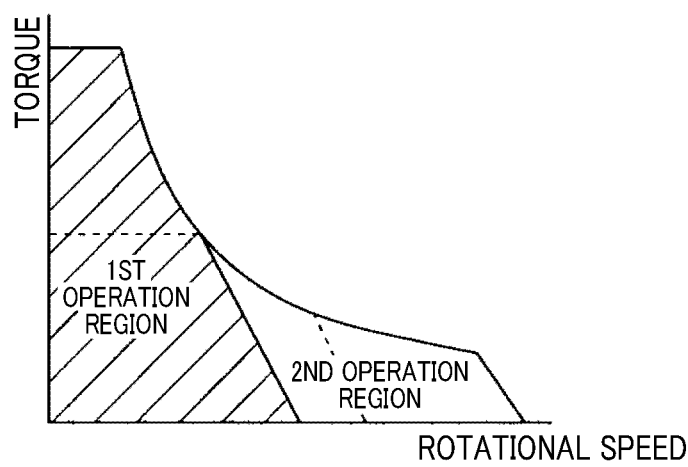
FIG. 7 is a graphical representation illustrating both first and second operation regions where the rotating electric machine according to the first embodiment is driven respectively by the first and second inverters.

Therefore, in the present embodiment, the first operation region where the rotating electric machine 10 is driven by the first inverter 50 and the second operation region where the rotating electric machine 10 is driven by the second inverter 60 are set as shown in FIG. 7. Specifically, the first operation region is set to be on the lower rotational speed side, whereas the second operation region is set to be on the higher rotational speed side. In addition, for the sake of facilitating understanding, the first operation region is hatched in FIG. 7.

Moreover, as described above, the controller 70 switches the drive mode of the rotating electric machine 10 between the first and second drive modes depending on whether the rotating electric machine 10 operates in the first operation region or the second operation region. Specifically, when the rotating electric machine 10 operates in the first operation region (or lower rotational speed region), the controller 70 controls the first inverter 50 to drive the rotating electric machine 10. Consequently, both the serially-connected winding units of each of the winding groups 41-43 are energized by the first inverter 50. As a result, it becomes possible for the rotating electric machine 10 to output high torque in the lower rotational speed region according to the ampere-turns of the stator coil 33. In contrast, when the rotating electric machine 10 operates in the second operation region (or higher rotational speed region), the controller 70 controls the second inverter 60 to drive the rotating electric machine 10. Consequently, in each of the winding groups 41-43, only that one of the two serially-connected winding units which is on the neutral point N1 side is energized by the second inverter 60. Hence, the induced voltage of the rotating electric machine 10 applied to the second inverter 60 becomes half the induced voltage applied to the first inverter 50 when the rotating electric machine 10 is driven by the first inverter 50. As a result, under the same output voltage of the DC power supply 75, it becomes possible to drive the rotating electric machine 10 to rotate at higher speed.

Figure 8:
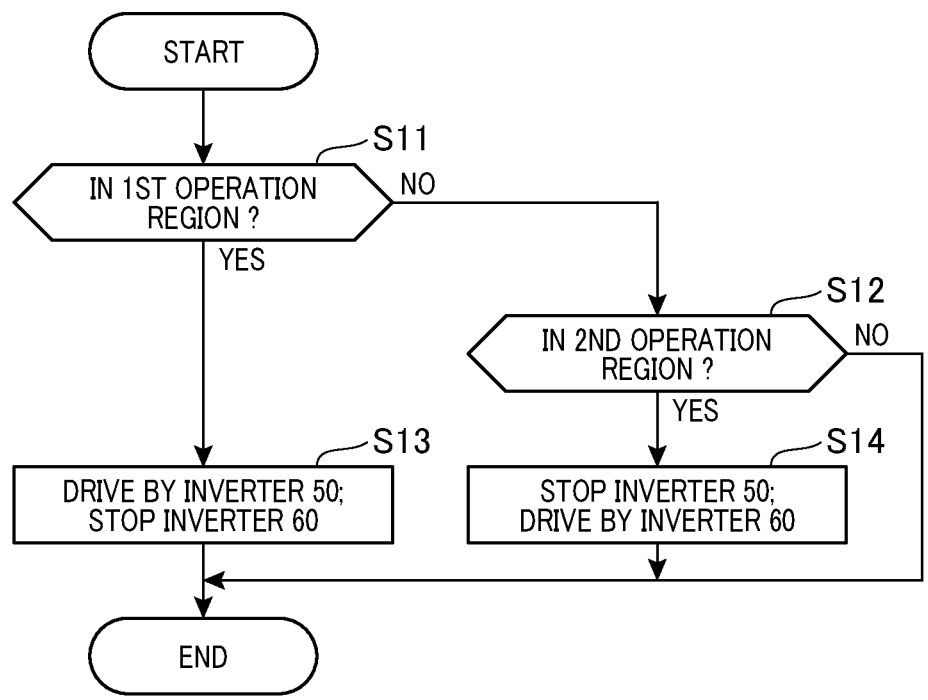
FIG. 8 is a flowchart illustrating a process of switching the drive mode of the rotating electric machine according to the first embodiment between first and second drive modes.

Next, a process of switching the drive mode of the rotating electric machine 10 between the first and second drive modes will be described with reference to FIG. 8. This process is repeatedly performed by the controller 70 in a predetermined cycle.

First, in step S11, a determination is made as to whether the rotating electric machine 10 is operating in the first operation region. Further, in step S12, a determination is made as to whether the rotating electric machine 10 is operating in the second operation region. In addition, the determinations in steps S11 and S12 may be made based on, for example, both the rotational speed calculated based on the rotation angle of the rotor 12 detected by the rotation angle sensor and the requested torque to the rotating electric machine 10.

If the rotating electric machine 10 is operating in the first operation region, i.e., if the determination in step S11 results in a "YES" answer, then the process proceeds to step S13. Otherwise, if the determination in step S11 results in a "NO" answer, then the process proceeds to step S12.

In step S13, the controller 70 sets the drive mode of the rotating electric machine 10 to the first drive mode. Then, the process terminates.

Specifically, in step S13, the controller 70 controls the first inverter 50 to drive the rotating electric machine 10; meanwhile, the controller 70 stops operation of the second inverter 60. Consequently, for each of the winding groups 41-43, the upper-arm and lower-arm switches 51 and 52 of the first inverter 50 corresponding to the winding group are turned on and off in a complementary manner, thereby energizing the winding group. More specifically, the IGBT 51a of the upper-arm switch 51 and the IGBT 52a of the lower-arm switch 52 are turned on and off in a complementary manner, while both the IGBT 51b of the upper-arm switch 51 and the IGBT 52b of the lower-arm switch 52 are kept in the ON state. At the same time, all of the upper-arm and lower-arm switches 61 and 62 of the second inverter 60 are kept in the OFF state.

In contrast, if the rotating electric machine 10 is operating in the second operation region, i.e., if the determination in step S12 results in a "YES" answer, then the process proceeds to step S14. Otherwise, if the determination in step S12 results in a "NO" answer, then the process terminates.

In step S14, the controller 70 sets the drive mode of the rotating electric machine 10 to the second drive mode. Then, the process terminates.

Specifically, in step S14, the controller 70 controls the second inverter 60 to drive the rotating electric machine 10; meanwhile, the controller 70 stops operation of the first inverter 50. Consequently, for each of the winding groups 41-43, the upper-arm and lower-arm switches 61 and 62 of the second inverter 60 corresponding to the winding group are turned on and off in a complementary manner, thereby energizing the winding group. At the same time, all of the upper-arm and lower-arm switches 51 and 5 of the first inverter 50 are kept in the OFF state.

According to the present embodiment, it is possible to achieve the following advantageous effects.

During the energization of the winding groups 41-43 by the second inverter 60, i.e., when only the neutral point N1-side winding units of the winding groups 41-43 are energized, regenerative current may flow through the first inverter 50, which is in the non-operating state, upon application of an induced voltage to the start terminals of the winding groups 41-43. However, according to the present embodiment, each of the upper-arm and lower-arm switches 51 and 52 of the first inverter 50 is configured to have the bidirectionally-conducting and bidirectionally-blocking functions. Consequently, it becomes possible to prevent generation of regenerative current flowing through the first inverter 50, without employing any regenerative current prevention switch in addition to the upper-arm and lower-arm switches 51 and 52 of the first inverter 50. Hence, it becomes possible to perform suitable energization control while preventing, during the energization of the winding groups 41-43 by the first inverter 50, the conduction loss along each of the current conduction paths of the winding groups 41-43 from increasing due to an increase in the electrical resistance along each of the current conduction paths.

Moreover, in the present embodiment, each of the upper-arm and lower-arm switches 51 and 52 of the first inverter 50 is configured as a bidirectional switch which has a pair of IGBTs 51a-51b or 52a-52b connected in antiparallel to each other. Consequently, during the energization of the winding groups 41-43 by the first inverter 50, the number of serially-connected elements in a conducting state in each of the current conduction paths of the winding groups 41-43 becomes equal to 2. Hence, it becomes possible to perform suitable energization control while preventing the conduction loss along each of the current conduction paths of the winding groups 41-43 from increasing due to an increase in the number of serially-connected elements in each of the current conduction paths. Moreover, it also becomes possible to impart the function of a flyback diode to each of the upper-arm and lower-arm switches 51 and 52 of the first inverter 50.

Furthermore, in the present embodiment, during the energization of the winding groups 41-43 by the first inverter 50, for each of the upper-arm and lower-arm switches 51 and 52 of the first inverter 50, the controller 70 turns on and off one of the pair of IGBTs 51a-51b or 52a-52b of the switch while keeping the other of the pair of IGBTs 51a-51b or 52a-52b of the switch in the ON state (or closed state). Consequently, those IGBTs of the upper-arm and lower-arm switches 51 and 52 of the first inverter 50 which are kept in the ON state can function as flyback diodes. Moreover, it becomes possible to minimize the number of times of each of the upper-arm and lower-arm switches 51 and 52 of the first inverter 50 being switched (or turned on and off), thereby minimizing the switching loss.

In the present embodiment, each of the upper-arm and lower-arm switches 51 and 52 of the first inverter 50 is configured with a pair of reverse-blocking IGBTs 51a-51b or 52a-52b connected in antiparallel to each other. On the other hand, each of the upper-arm and lower-arm switches 61 and 62 of the second inverter 60 is configured with an IGBT having a flyback diode 63 or 64 connected in antiparallel thereto. Consequently, it becomes possible to employ the reverse-blocking IGBTs only for the switches 51 and 52 of the first inverter 50 while utilizing an existing inverter configuration where each of the upper-arm and lower-arm switches is configured with an IGBT having a flyback diode connected in antiparallel thereto.

In the present embodiment, the controller 70 controls the first inverter 50 to drive the rotating electric machine 10 when the rotating electric machine 10 operates in the first operation region (or lower rotational speed region), and controls the second inverter 60 to drive the rotating electric machine 10 when the rotating electric machine 10 operates in the second operation region (or higher rotational speed region). Consequently, it becomes possible for the control system (or drive apparatus) to suitably drive the rotating electric machine 10 over a wide rotational speed range according to the vehicle request. As a result, it becomes possible to improve the power performance of the electrically-driven vehicle.

Moreover, in the present embodiment, the drive mode of the rotating electric machine 10 is switched between the first and second drive modes by electronic control using the semiconductor switching elements. Consequently, the drive mode of the rotating electric machine 10 can be smoothly switched during, for example, acceleration of the electrically-driven vehicle. As a result, it becomes possible to improve the fuel economy and riding comfort of the electrically-driven vehicle.

Furthermore, with the use of both the first and second inverters 50 and 60 for driving the rotating electric machine 10, it becomes possible to make the drive system (or control system) redundant, thereby improving the reliability of the drive system.

Second Embodiment

In the above-described first embodiment, the ratio between the number of turns energized by the first inverter 50 and the number of turns energized by the second inverter 60 in each of the winding groups 41-43 is set to (2:1).

In comparison, in the second embodiment, the ratio between the number of turns energized by the first inverter 50 and the number of turns energized by the second inverter 60 in each of the winding groups 41-43 is set to (3:2).

Figure 9:
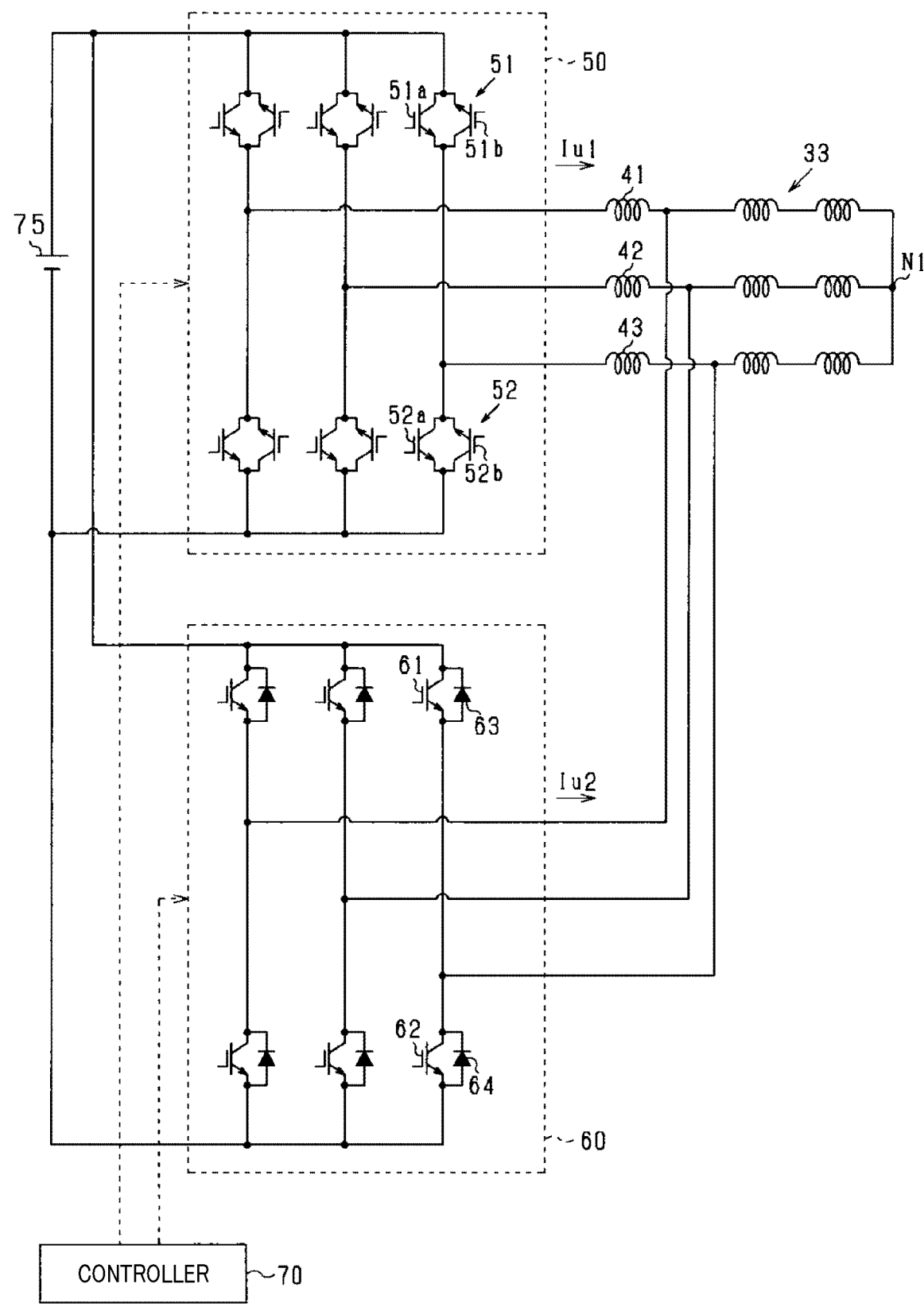
FIG. 9 is a schematic circuit diagram illustrating the configuration of a control system for controlling a rotating electric machine according to a second embodiment.

Specifically, in the second embodiment, as shown in FIG. 9, each of the winding groups 41-43 of the stator coil 33 consists of three winding units that are connected in series with each other. Moreover, each of the winding groups 41-43 has first and second ends opposite to each other. All of the first ends of the winding groups 41-43 are connected together to define a neutral point N1 therebetween. Each of the winding groups 41-43 also has a start terminal formed at the second end thereof and an intermediate terminal formed between those two of the three winding units thereof which are located closer to the second end than the remaining one of the three winding units is.

Moreover, in the second embodiment, the first inverter 50 is connected with the start terminals of the winding groups 41-43. The second inverter 60 is connected with the intermediate terminals of the winding groups 41-43.

Furthermore, in the second embodiment, in each of the winding groups 41-43, the numbers of turns of the three winding units are set to be equal to each other. Consequently, the ratio between the number of turns energized by the first inverter 50 and the number of turns energized by the second inverter 60 in each of the winding groups 41-43 becomes equal to (3:2).

Setting the ratio between the number of turns energized by the first inverter 50 and the number of turns energized by the second inverter 60 to (3:2) in the second embodiment, the output characteristics of the rotating electric machine 10 are changed in comparison with the case of setting the ratio to (2:1) in the first embodiment.

Figure 10:
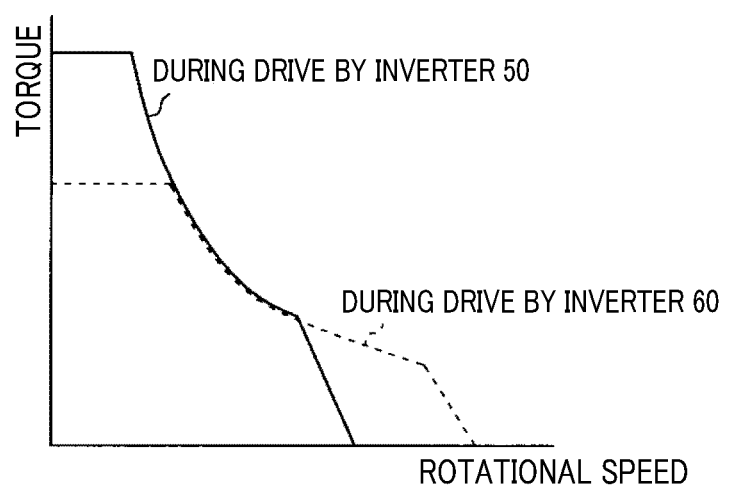
FIG. 10 is a graphical representation illustrating the output characteristics of the rotating electric machine according to the second embodiment both when the machine is driven by a first inverter of the control system and when the machine is driven by a second inverter of the control system.

Specifically, FIG. 10 shows the output characteristics of the rotating electric machine 10 in both the first and second drive modes (i.e., both when the machine 10 is driven by the first inverter 50 and when the machine 10 is driven by the second inverter 60) according to the second embodiment.

Comparing FIG. 10 with FIG. 6, it can be seen that the output characteristics of the rotating electric machine 10 in the second drive mode (i.e., when the machine 10 is driven by the second inverter 60) are shifted to the lower rotational speed side in the case of setting the ratio between the number of turns energized by the first inverter 50 and the number of turns energized by the second inverter 60 to (3:2) than in the case of setting the ratio to (2:1).

In addition, in each of the winding groups 41-43, the intermediate terminal, to which the second inverter 60 is connected, may alternatively be formed between those two of the three winding units which are located closer to the neutral point N1 than the remaining one of the three winding units is. In this case, the ratio between the number of turns energized by the first inverter 50 and the number of turns energized by the second inverter 60 in each of the winding groups 41-43 will become equal to (3:1). Moreover, each of the winding groups 41-43 may alternatively consist of four or more winding units that are connected in series with each other.

Third Embodiment

In the above-described first embodiment, each of the winding groups 41-43 consists of two winding units that are connected in series with each other. Moreover, the control system (or drive apparatus) includes two inverters, i.e., the first and second inverters 50 and 60 for driving the rotating electric machine 10 (see FIG. 3).

In comparison, in the third embodiment, each of the winding groups 41-43 consists of three winding units that are connected in series with each other. Moreover, the control system includes three inverters for driving the rotating electric machine 10.

Figure 11:
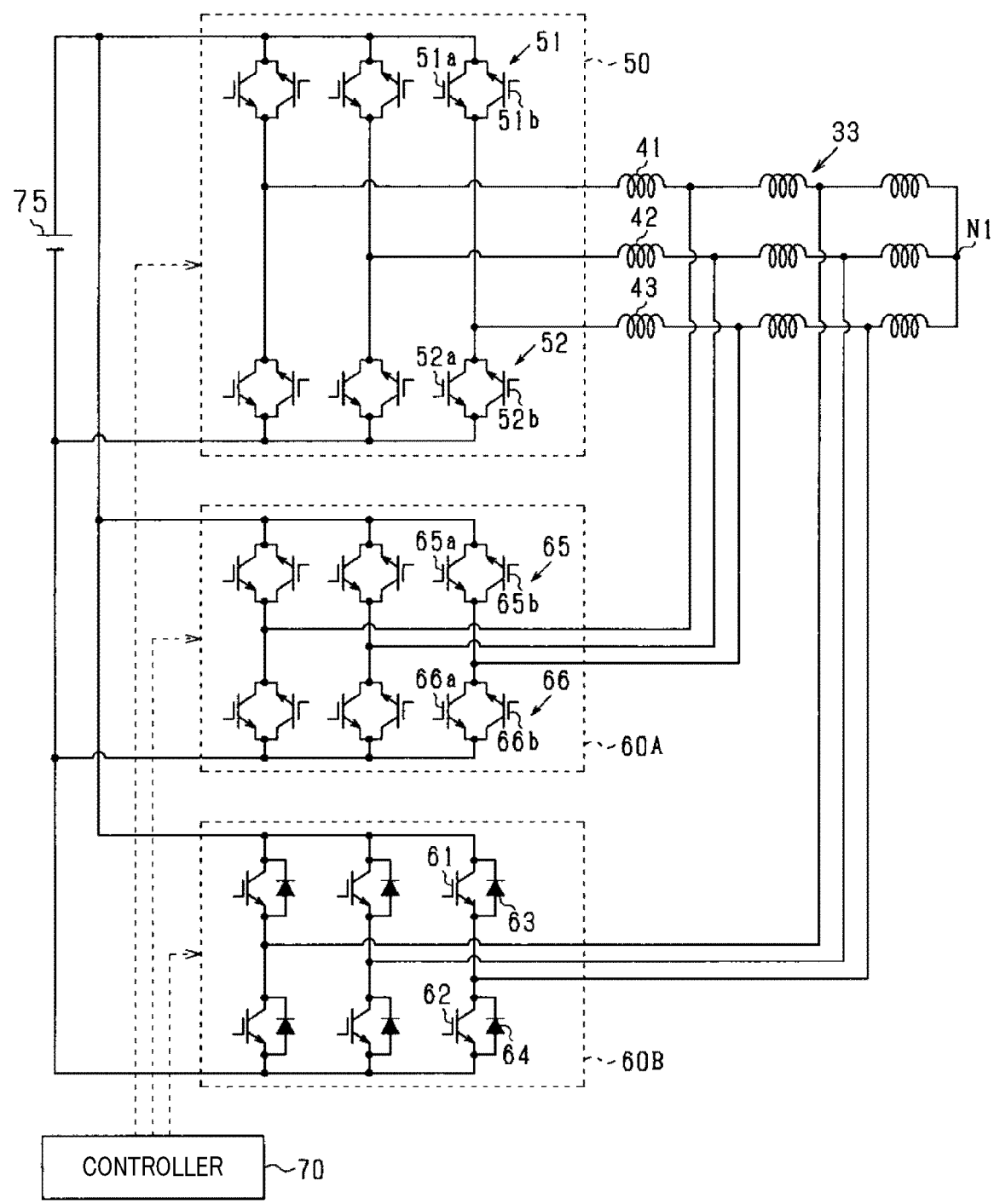
FIG. 11 is a schematic circuit diagram illustrating the configuration of a control system for controlling a rotating electric machine according to a third embodiment.

Specifically, in the third embodiment, as shown in FIG. 11, each of the winding groups 41-43 has first and second ends opposite to each other. All of the first ends of the winding groups 41-43 are connected together to define a neutral point N1 therebetween. Each of the winding groups 41-43 also has a start terminal formed at the second end thereof and two intermediate terminals each formed between one adjacent pair of the winding units thereof.

Moreover, in the third embodiment, the control apparatus includes a first inverter 50 and a pair of second inverters 60A and 60B. The first inverter 50 is connected with the start terminals of the winding groups 41-43. The second inverter 60A is connected with that one of the two intermediate terminals in each of the winding groups 41-43 which is located closer to the start terminal than to the neutral point N1. On the other hand, the second inverter 60B is connected with that one of the two intermediate terminals in each of the winding groups 41-43 which is located closer to the neutral point N1 than to the start terminal.

Furthermore, in the third embodiment, the first inverter 50 and the second inventor 60A have the same configuration as the first inverter 50 in the first embodiment (see FIG. 3). That is, each of the upper-arm and lower-arm switches of the first inverter 50 and the second inventor 60A is configured as a bidirectional switch having bidirectionally-conducting and bidirectionally-blocking functions.

More specifically, in the third embodiment, the first inverter 50 is identical to the first inverter 50 in the first embodiment. Moreover, as shown in FIG. 11, in the second inverter 60A, each of the upper-arm switches 65 is configured with a pair of reverse-blocking IGBTs 65a and 65b connected in antiparallel to each other; and each of the lower-arm switches 66 is configured with a pair of reverse-blocking IGBTs 66a and 66b connected in antiparallel to each other. On the other hand, the second inverter 60B is identical to the second inverter 60 in the first embodiment.

In the third embodiment, the drive mode of the rotating electric machine 10 is switched by the controller 70 between a first drive mode in which the rotating electric machine 10 is driven by the first inverter 50, a second drive mode in which the rotating electric machine 10 is driven by the second inverter 60A, and a third drive mode in which the rotating electric machine 10 is driven by the second inverter 60B. By this switching, the number of energized turns in each of the winding groups 41-43 becomes variable.

Figure 12:
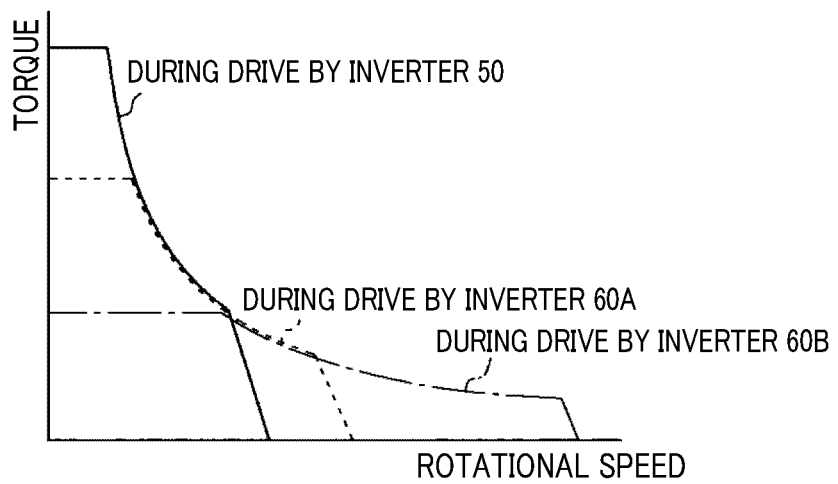
FIG. 12 is a graphical representation illustrating the output characteristics of the rotating electric machine according to the third embodiment when the machine is driven by a first inverter of the control system, when the machine is driven by a second inverter of the control system and when the machine is driven by another second inverter of the control system.

FIG. 12 shows the output characteristics of the rotating electric machine 10 in the first, second and third drive modes (i.e., when the machine 10 is driven by the first inverter 50, when the machine 10 is driven by the second inverter 60A and when the machine 10 is driven by the second inverter 60B) according to the third embodiment. As seen from FIG. 12, the output characteristics of the rotating electric machine 10 are shifted to the higher rotational speed side in the order of the first drive mode→second drive mode→third drive mode (or in the order of 50→60A→60B).

The controller 70 switches, based on the rotational speed and torque of the rotating electric machine 10, the drive mode of the rotating electric machine 10 between the first drive mode, the second drive mode and the third drive mode. The operation regions of the rotating electric machine 10, in which the machine 10 is driven respectively in the first, second and third drive modes (or respectively by the inverters 50, 60A and 60B), may be set based on the output characteristics of the rotating electric machine 10 shown in FIG. 12.

As described above, in the present embodiment, of the two second inverters 60A and 60B connected with the intermediate terminals of the winding groups 41-43, the second inverter 60A connected with the start terminal-side intermediate terminals of the winding groups 41-43 is configured the same as the first inverter 50. That is, each of the upper-arm and lower-arm switches 65 and 66 of the second inverter 60A is configured as a bidirectional switch having bidirectionally-conducting and bidirectionally-blocking functions. Consequently, it becomes possible to suitably switch the drive mode of the rotating electric machine 10 between the first, second and third drive modes while preventing the conduction loss along each of the current conduction paths of the winding groups 41-43 from increasing due to an increase in the electrical resistance along each of the current conduction paths (or an increase in the number of serially-connected elements in each of the current conduction paths).

In addition, each of the winding groups 41-43 may alternatively consist of four or more winding units that are connected in series with each other. Moreover, in the case of each of the winding groups 41-43 consisting of, for example, four winding units that are connected in series with each other, the control system may include a first inverter and three second inverters. The first inverter may be connected with the start terminals of the winding groups 41-43. The three second inverters may be connected respectively with three intermediate terminals in each of the winding groups 41-43. Moreover, of the three second inverters, only that second inverter which is connected with the intermediate terminal located closest to the start terminal in each of the winding groups 41-43 or those two second inverters which are connected respectively with the two intermediate terminals located closest and second-closest to the start terminal in each of the winding groups 41-43 may have the upper-arm and lower-arm switches thereof configured to each have bidirectionally-conducting and bidirectionally-blocking functions.

Fourth Embodiment

In the above-described first embodiment, the rotating electric machine 10 includes the single three-phase stator coil 33 that is composed of the U-phase, V-phase and W-phase windings respectively formed of the winding groups 41-43 (see FIG. 3).

Figure 13:
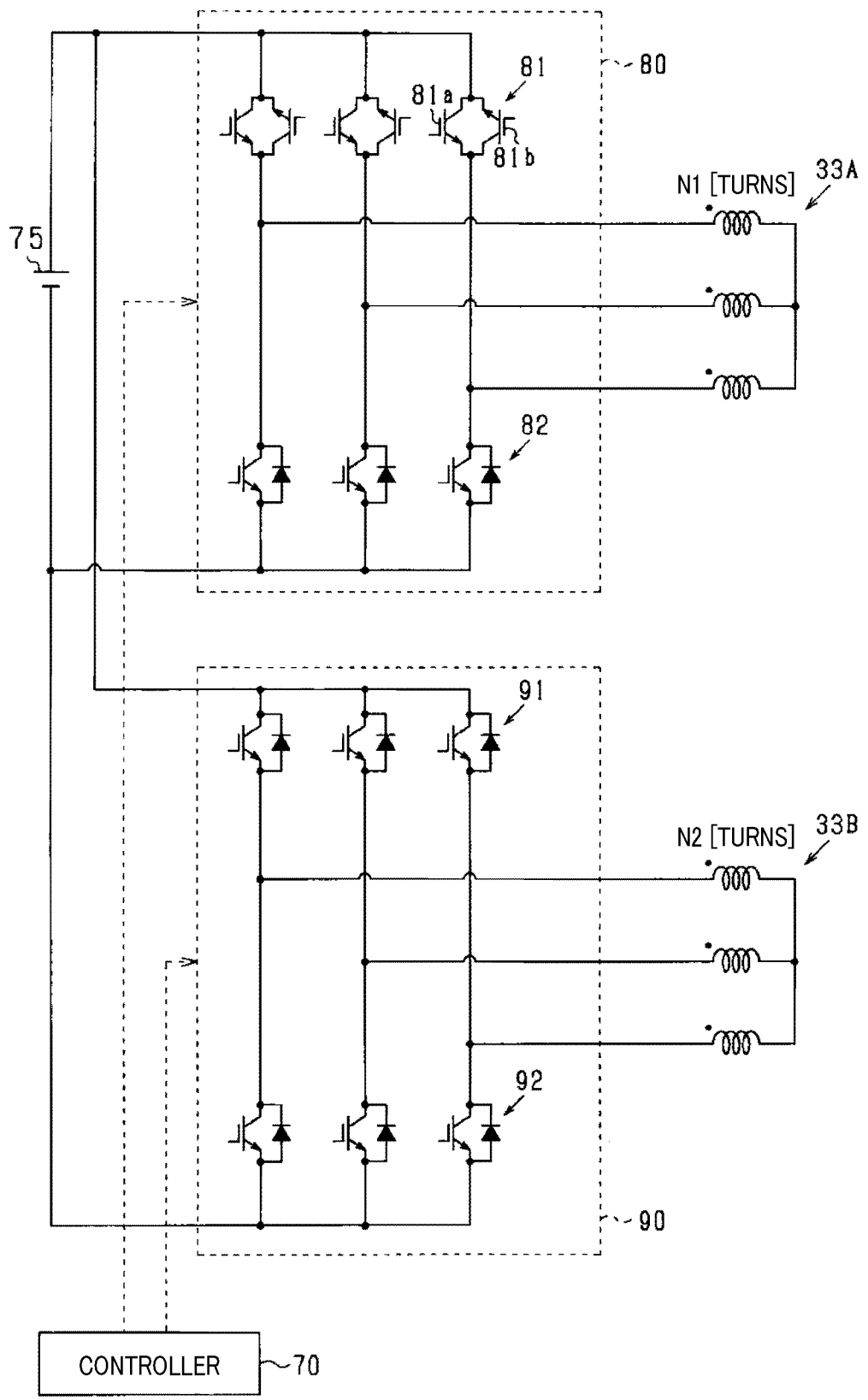
FIG. 13 is a schematic circuit diagram illustrating the configuration of a control system for controlling a rotating electric machine according to a fourth embodiment.

In comparison, in the fourth embodiment, as shown in FIG. 13, the rotating electric machine 10 includes, as the stator coil 33, both a first three-phase coil 33A and a second three-phase coil 33B.

Each of the first and second three-phase coils 33A and 33B is composed of three winding units for respective phases. Each of the winding units has first and second ends opposite to each other. All of the first ends of the winding units of the first three-phase coil 3 are connected together to define a neutral point therebetween. Similarly, all of the first ends of the winding units of the second three-phase coil 33B are connected together to define a neutral point therebetween.

In the present embodiment, the number of turns of the first three-phase coil 33A is set to be larger than the number of turns of the second three-phase coil 33B. That is, N1>N2, where N1 is the number of turns of the first three-phase coil 33A and N2 is the number of turns of the second three-phase coil 33B. In addition, each of the first and second three-phase coils 33A and 33B is mounted on the stator core 31 so as to be received in the slots 32 of the stator core 31.

Moreover, in the present embodiment, the control system (or drive apparatus) includes a first inverter 80 connected with the second ends of the winding units of the first three-phase coil 33A and a second inverter 90 connected with the second ends of the winding units of the second three-phase coil 33B. The first inverter 80 includes three switch pairs respectively corresponding to the three winding units of the first three-phase coil 33A and each consisting of an upper-arm switch 81 and a lower-arm switch 82 that are connected in series with each other. Similarly, the second inverter 90 includes three switch pairs respectively corresponding to the three winding units of the second three-phase coil 33B and each consisting of an upper-arm switch 91 and a lower-arm switch 92 that are connected in series with each other.

Specifically, in the present embodiment, each of the upper-arm switches 81 of the first inverter 80 is configured with a pair of IGBTs 81a and 81b that are connected in opposite directions and parallel to each other. The pair of IGBTs 81a and 81b is implemented by a pair of reverse-blocking IGBTs connected in antiparallel to each other. Consequently, each of the upper-arm switches 81 of the first inverter 80 can function as a bidirectional switch to bidirectionally conduct and bidirectionally block electric current.

On the other hand, each of the lower-arm switches 82 of the first inverter 80 and the upper-arm and lower-arm switches 91 and 92 of the second inverter 90 is configured with a semiconductor switching element (e.g., an IGBT) having a flyback diode connected in antiparallel thereto.

In the present embodiment, the controller 70 selectively performs energization of the first three-phase coil 33A by the first inverter 80 and energization of the second three-phase coil 33B by the second inverter 90.

The first and second inverters 80 and 90 are controlled by the controller 70 basically in the same manner as described in the first embodiment with referent to FIGS. 4 and 5. However, in the present embodiment, each of the lower-arm switches 82 of the first inverter 80 is configured with an IGBT having a flyback diode connected in antiparallel thereto, unlike in the first embodiment. Therefore, in the present embodiment, when the rotating electric machine 10 is driven by the first inverter 80, for each of the winding units of the first three-phase coil 33A, the IGBT 81a of the upper-arm switch 81 and the lower-arm switch 82 corresponding to (i.e., connected with) the winding unit are turned on and off in a complementary manner, while the IGBT 81b of the upper-arm switch 81 is kept in an ON state (or closed state).

In the present embodiment, only one of energization of the first three-phase coil 33A by the first inverter 80 and energization of the second three-phase coil 33B by the second inverter 90 is performed at each time. That is, the drive mode of the rotating electric machine 10 is switched by the controller 70 between a first drive mode in which the first three-phase coil 33A having the larger number of turns is energized by the first inverter 80 and a second drive mode in which the second three-phase coil 33B having the smaller number of turns is energized by the second inverter 90.

In the second drive mode of the rotating electric machine 10 (i.e., when the second three-phase coil 33B having the smaller number of turns is energized by the second inverter 90), regenerative current may flow through the first inverter 80 that is in a non-operating state (or stopped state), upon application of an induced voltage, which is induced in the first three-phase coil 33A having the larger number of turns, to the first inverter 80. To solve this problem, a disconnect switch may be provided in an energization path of the first inverter 80 to cut off the energization path before generation of regenerative current. However, in this case, it would be necessary to keep the disconnect switch in an ON state in the first drive mode of the rotating electric machine 10 (i.e., when the first three-phase coil 33A is energized by the first inverter 80). Consequently, the number of serially-connected elements in a current conduction path of the rotating electric machine 10 would be increased, thereby increasing the electrical resistance and thus the conduction loss along the current conduction path.

In view of the above, in the present embodiment, each of the upper-arm switches 81 of the first inverter 80 is configured to have bidirectionally-conducting and bidirectionally-blocking functions (in other words, configured to be capable of bidirectionally conducting and bidirectionally blocking electric current). Consequently, it becomes possible to prevent generation of regenerative current flowing through the first inverter 80, without employing any regenerative current prevention switch in addition to the upper-arm and lower-arm switches 81 and 82 of the first inverter 80. Hence, it becomes possible to perform suitable energization control while preventing, in the first drive mode of the rotating electric machine 10, the conduction loss along each of the current conduction paths of the winding units of the first three-phase coil 33A from increasing due to an increase in the number of serially-connected elements in each of the current conduction paths.

In addition, the controller 70 may alternatively perform both energization of the first three-phase coil 33A by the first inverter 80 and energization of the second three-phase coil 33B by the second inverter 90 at the same time. In this case, with the same-phase winding units of the first and second three-phase coils 33A and 33B being energized at the same time, it will become possible to realize high-torque operation of the rotating electric machine 10.

While the above particular embodiments have been shown and described, it will be understood by those skilled in the art that various modifications, changes, and improvements may be made without departing from the spirit of the present disclosure.

For example, in the above-described fourth embodiment, in the first inverter 80, each of the upper-arm switches 81 is configured as a bidirectional switch which includes a pair of reverse-blocking IGBTs connected in antiparallel to each other, while each of the lower-arm switches 82 is configured with an IGBT having a flyback diode connected in antiparallel thereto (see FIG. 13). As an alternative, each of the lower-arm switches 82 may be configured as a bidirectional switch which includes a pair of reverse-blocking IGBTs connected in antiparallel to each other, while each of the upper-arm switches 81 is configured with an IGBT having a flyback diode connected in antiparallel thereto. As another alternative, each of the upper-arm and lower-arm switches 81 and 82 may be configured as a bidirectional switch which includes a pair of reverse-blocking IGBTs connected in antiparallel to each other.

In the above-described embodiments, in the upper-arm and lower-arm switches of the inverters, IGBTs are employed as the semiconductor switching elements. However, the semiconductor switching elements are not limited to IGBTs. For example, MOSFETs (Metal-Oxide-Semiconductor Field-Effect Transistors) may be employed, instead of IGBTs, as the semiconductor switching elements. In this case, those of the upper-arm and lower-arm switches of the inverters which are required to have bidirectionally-conducting and bidirectionally-blocking functions may each be configured with a pair of MOSFETs formed of a wide-gap semiconductor material and connected in opposite directions and in series with each other; the remainder of the upper-arm and lower-arm switches may each be configured with a MOSFET having a flyback diode connected in antiparallel thereto. Moreover, it is preferable for the wide-gap semiconductor material to be a SiC-based (i.e., silicon carbide-based) material or a GaN-based (i.e., gallium nitride-based) material. With employment of the MOSFETs formed of a wide-gap semiconductor material, it will be possible to reduce the on-resistances of those of the upper-arm and lower-arm switches which are required to have bidirectionally-conducting and bidirectionally-blocking functions. Consequently, it will become possible to perform suitable energization control while further suppressing, during the drive of the rotating electric machine 10 by the first inverter, increase in the conduction loss in comparison with the case of employing one or more regenerative current prevention switches in addition to the upper-arm and lower-arm switches.

In the above-described embodiments, the rotating electric machine 10 is configured as a three-phase AC motor. However, the rotating electric machine 10 may alternatively be configured as, for example, a five-phase AC motor.

In the above-described embodiments, the rotating electric machine 10 is configured to have a magnet rotor structure. However, the rotating electric machine 10 may alternatively be configured to have an induction rotor structure.

In the above-described embodiments, the rotating electric machine 10 is configured to have an inner rotor structure. However, the rotating electric machine 10 may alternatively be configured to have an outer rotor structure.

What is claimed is:

1. A drive apparatus for driving a multi-phase rotating electric machine,
the rotating electric machine comprising a plurality of winding groups for respective phases, each of the winding groups consisting of a plurality of winding units that are connected in series with each other, each of the winding groups having a first end and a second end, all of the first ends of the winding groups being connected together to define a neutral point therebetween, each of the winding groups also having a start terminal formed at the second end thereof and an intermediate terminal formed between two of the winding units thereof,
the drive apparatus comprising:
a first inverter connected with the start terminals of the winding groups of the rotating electric machine, the first inverter including a plurality of switch pairs respectively corresponding to the winding groups of the rotating electric machine and each consisting of an upper-arm switch and a lower-arm switch that are connected in series with each other;
a second inverter connected with the intermediate terminals of the winding groups of the rotating electric machine, the second inverter including a plurality of switch pairs respectively corresponding to the winding groups of the rotating electric machine and each consisting of an upper-arm switch and a lower-arm switch that are connected in series with each other; and
an energization controller configured to selectively perform energization of the winding groups of the rotating electric machine by the first inverter and energization of the winding groups by the second inverter,
wherein
each of the upper-arm and lower-arm switches of the first inverter is configured to have bidirectionally-conducting and bidirectionally-blocking functions.

2. The drive apparatus as set forth in claim 1, wherein each of the upper-arm and lower-arm switches of the first inverter is configured as a bidirectional switch which has a pair of IGBTs (Insulated Gate Bipolar Transistors) connected in antiparallel to each other.

3. The drive apparatus as set forth in claim 2, wherein during the energization of the winding groups of the rotating electric machine by the first inverter, for each of the upper-arm and lower-arm switches of the first inverter, the energization controller turns on and off one of the pair of IGBTs of the switch while keeping the other of the pair of IGBTs of the switch in an ON state.

4. The drive apparatus as set forth in claim 2, wherein each of the upper-arm and lower-arm switches of the first inverter is configured with a pair of reverse-blocking IGBTs connected in antiparallel to each other, and each of the upper-arm and lower-arm switches of the second inverter is configured with a semiconductor switching element having a flyback diode connected in antiparallel thereto.

5. The drive apparatus as set forth in claim 1, wherein each of the winding groups of the rotating electric machine consists of three or more winding units that are connected in series with each other, each of the winding groups has two or more intermediate terminals each of which is formed between one adjacent pair of the winding units of the winding group, the drive apparatus comprises two or more second inverters that are connected respectively with the two or more intermediate terminals in each of the winding groups, each of the two or more second inverters includes a plurality of switch pairs respectively corresponding to the winding groups and each consisting of an upper-arm switch and a lower-arm switch that are connected in series with each other, and of the two or more second inverters, at least the second inverter that is connected with the intermediate terminal located closest to the start terminal in each of the winding groups has the upper-arm and lower-arm switches thereof configured to each have bidirectionally-conducting and bidirectionally-blocking functions.

6. A drive apparatus for driving a rotating electric machine, the rotating electric machine comprising a first multi-phase coil and a second multi-phase coil, each of the first and second multi-phase coils being composed of a plurality of winding units for respective phases, each of the winding units having a first end and a second end, all of the first ends of the winding units being connected together to define a neutral point therebetween, the drive apparatus comprising:

a first inverter connected with the second ends of the winding units of the first multi-phase coil, the first inverter including a plurality of switch pairs respectively corresponding to the winding units of the first multi-phase coil and each consisting of an upper-arm switch and a lower-arm switch that are connected in series with each other;

a second inverter connected with the second ends of the winding units of the second multi-phase coil, the second inverter including a plurality of switch pairs respectively corresponding to the winding units of the second multi-phase coil and each consisting of an upper-arm switch and a lower-arm switch that are connected in series with each other; and an energization controller configured to selectively perform energization of the first multi-phase coil by the first inverter and energization of the second multi-phase coil by the second inverter, wherein the number of turns of the first multi-phase coil is larger than the number of turns of the second multi-phase coil, and in the first inverter, either or both of the upper-arm switches and the lower-arm switches are configured to each have bidirectionally-conducting and bidirectionally-blocking functions.

\* \* \* \* \*